United States Patent [19]
Taniishi et al.

[11] Patent Number: 5,177,472
[45] Date of Patent: Jan. 5, 1993

[54] VIBRATING INPUT PEN USED FOR A COORDINATE INPUT APPARATUS

[75] Inventors: Shinnosuke Taniishi, Kawasaki; Ryozo Yanagisawa, Matsudo; Katsuyuki Kobayashi, Yokohama; Yuichiro Yoshimura, Yokohama; Kiyoshi Kaneko, Yokohama; Takeshi Kamono, Chohshi; Atsushi Tanaka, Kawasaki, all of Japan

[73] Assignee: Canon Kabushiki Kaisha, Tokyo, Japan

[21] Appl. No.: 631,969

[22] Filed: Dec. 21, 1990

[30] Foreign Application Priority Data

Dec. 25, 1989 [JP] Japan ............... 1-332783
Apr. 26, 1990 [JP] Japan ............... 2-114594
Apr. 27, 1990 [JP] Japan ............... 2-111979

[51] Int. Cl.⁵ ............................................. G09G 3/02
[52] U.S. Cl. ..................................... 340/706; 178/18
[58] Field of Search ............... 340/706, 708, 712; 178/18, 19; 367/127, 129, 907

[56] References Cited

U.S. PATENT DOCUMENTS 4,853,496  8/1989  Taniishi .
4,883,926  11/1989  Baldwin ........................ 178/18
4,887,245  12/1989  Mori et al. .................... 367/129
4,931,965  6/1990  Kaneko et al. .

5,017,913  5/1991  Kaneko et al. .

FOREIGN PATENT DOCUMENTS 0107922  5/1984  European Pat. Off. .
0270909  6/1988  European Pat. Off. .
0079385  5/1984  Japan ........................... 340/706
0083282  5/1984  Japan ........................... 340/706
0225438  12/1984  Japan ........................... 340/706
2042726  9/1980  United Kingdom .

Primary Examiner—Alvin E. Oberley
Assistant Examiner—Matthew Luu
Attorney, Agent, or Firm—Fitzpatrick, Cella, Harper & Scinto

[57] ABSTRACT

A vibrating input pen used for a coordinate input apparatus for detecting a coordinate of an input position of a vibration by detecting the vibration input from the vibrating input pen to a vibration transmitting plate includes a vibration generating element for generating a vibration and a horn member forming a pen point of the vibrating input pen for transmitting the vibration generated from the vibration generating element. A positioning member positions the vibration generating element in relation to the horn member so that the direction of vibration of the vibration generating element coincides with the direction of vibration of the horn member and the axis of the vibration generating element coincides with the axis of the horn member.

12 Claims, 8 Drawing Sheets

(GREASE COATED ON BOTH SURFACES)

DIRECTION OF VIBRATION

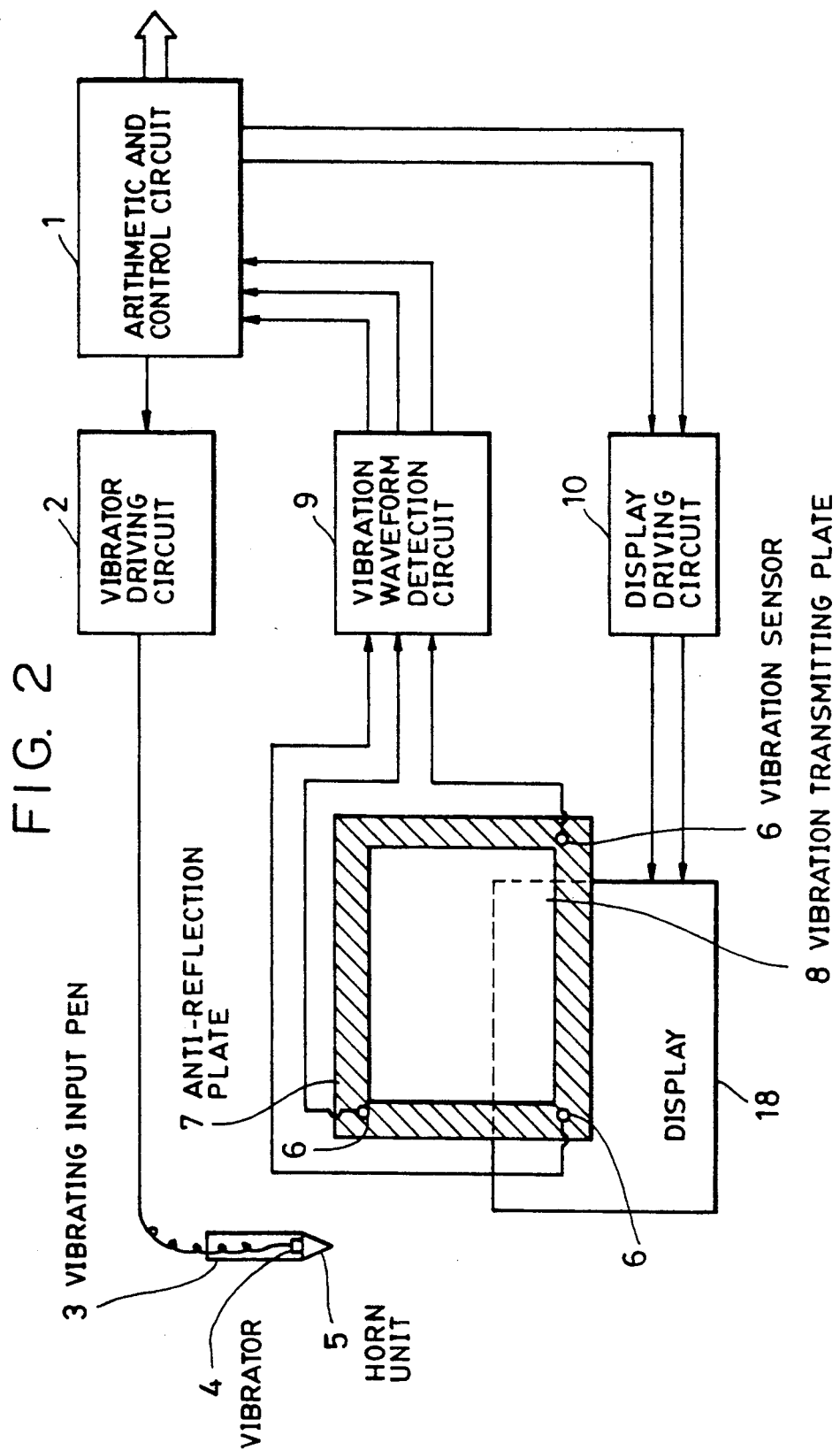

8
VIBRATION
TRANSMITTING
PLATE

VIBRATING INPUT PEN USED FOR A COORDINATE INPUT APPARATUS

BACKGROUND OF THE INVENTION

1. Field of the Invention

This invention relates to a vibrating input pen for coordinate input of a coordinate input apparatus, and more particularly, to a coordinate input apparatus in which vibration input from the vibrating input pen is detected by a plurality of sensors provided on a vibration transmitting plate, and thereby determining the coordinates of the vibrating input pen on the vibration transmitting plate.

2. Description of the Related Art

Among various kinds of coordinate input apparatus which have been proposed, there is an apparatus utilizing the transmission of vibration as a method using a simple yet high reliability structure. This apparatus detects vibration input from a vibrating input pen with a plurality of sensors provided on a vibration transmitting plate, and thereby detects the coordinates of a position of the vibrating input pen on the vibration transmitting plate.

The vibrator used in the above-described vibrating input pen is an electromechanical transducer having the direction of its polarization perpendicular to the direction of its vibration (this kind of element will be hereinafter termed a "direction-K31 piezoelectric element"). FIGS. 7(A) and 7(C) are cross-sectional views of principal parts showing the internal structures of vibrating input pens which have been used: FIG. 7(A) illustrates a configuration using a cylindrical piezoelectric element; and FIG. 7(C) illustrates a configuration using a columnar piezoelectric element.

In FIGS. 7(A) and 7(C), a horn unit 52 transmits vibration from a vibrator 41 or 42 to a vibration transmitting plate. A pen case 31 receiving components of the vibrating input pen is shaped to be easily held by a hand. In FIG. 7(A), the vibrator 41, which is a cylindrical piezoelectric element, is a direction-K31 piezoelectric element. Hence, the vibrator 41 is configured so that electric energy is supplied from electrode springs 361 and 371, serving as driving electrodes for the vibrator 41, which are in pressure contact with the inner and outer surfaces of the cylinder, respectively. Since vibration is generated in the direction of the axis of the pen as shown in FIG. 7(B), the transmission efficiency of vibration to the horn unit 52 is high. In case of FIG. 7(C), the vibrator 42 (FIG. 7(D)), which is a columnar piezoelectric element, is configured so that electric energy is supplied from soldered lead wires L360. In this case, since the vibrator 42 is a direction-K31 piezoelectric element, the direction of its vibration is perpendicular to the direction of the axis of the pen. Accordingly, in order to prevent the transmission efficiency of vibration to the horn unit 52 from being substantially decreased, the vibrator 42 and the horn unit 52 are fixed together by a means, such as bonding or the like.

However, when the direction-K31 piezoelectric element is cylindrical as shown in FIG. 7(A), even if the pen point and the axis of the cylindrical piezoelectric element in the direction of vibration are aligned on a line, pressures by the electrodes provided on the inner and outer surfaces of the piezoelectric element cannot be uniform. Hence, physical vibration characteristics change due to factors such as maldistribution of piezoelectric characteristics caused by an unbalance in external forces on the element when the electrodes are mounted, and the vibration of the vibrating input pen has directivity relative to the axis in a vibration mode. As a result, a stable coordinate detection operation has sometimes been impossible.

On the other hand, when the direction-K31 piezoelectric element is columnar as shown in FIG. 7(C), since the element vibrates in a direction perpendicular to the axis of the pen, the element must be fixed to the pen point (the horn unit 52) by an adhesive or the like in order to increase the transmission efficiency of vibration. In this case, it is impossible to replace only the pen point when the pen point is used up or in an unexpected accident, such as breakage of the pen point or the like. As a result, the user must bear a high cost burden.

Furthermore, in the case of the cylindrical direction-K31 piezoelectric element, if bonding is used in order to increase the transmission efficiency of vibration and also to supply electric power to the element, the resonance characteristics of the vibrating input pen must be uniform in order to maintain accuracy in the coordinate input apparatus. As a result, the vibrating input pen using such an element has the disadvantages that productivity in the production of the pen is decreased due to factors such as control of the thickness of an adhesive layer for bonding, and the above-described directivity appears when, for example, bubbles are formed in the adhesive layer, or partially imperfect bonding is performed, causing a decrease in the production yield.

SUMMARY OF THE INVENTION

It is an object of the present invention to provide a low-cost vibrating input pen for coordinate input capable of stably vibrating its point.

It is another object of the present invention to provide a vibrating input pen for coordinate input in which the problem of directivity of the vibrating input pen can be solved, and productivity in the production of the pen can be increased.

It is still another object of the present invention to provide a vibrating input pen for coordinate input in which a vibration generating element can be easily connected electrically to a driving circuit without using a means, such as soldering or the like, without reducing the performance of the element and with using a low-cost element.

The invention is directed to a vibrating input pen for a coordinate input apparatus having a vibration generator and a horn member that transmits the vibration from the vibration generator. The vibration generator is positioned so that the direction of its vibration substantially coincides with the direction of vibration of the horn member and the axis of the vibration generator substantially coincides with the axis of the horn member.

BRIEF DESCRIPTION OF THE DRAWINGS

FIG. 2 is a block diagram showing the schematic configuration of an information input apparatus to which the present invention is applied;

DETAILED DESCRIPTION OF THE PREFERRED EMBODIMENT

Figure 1A:
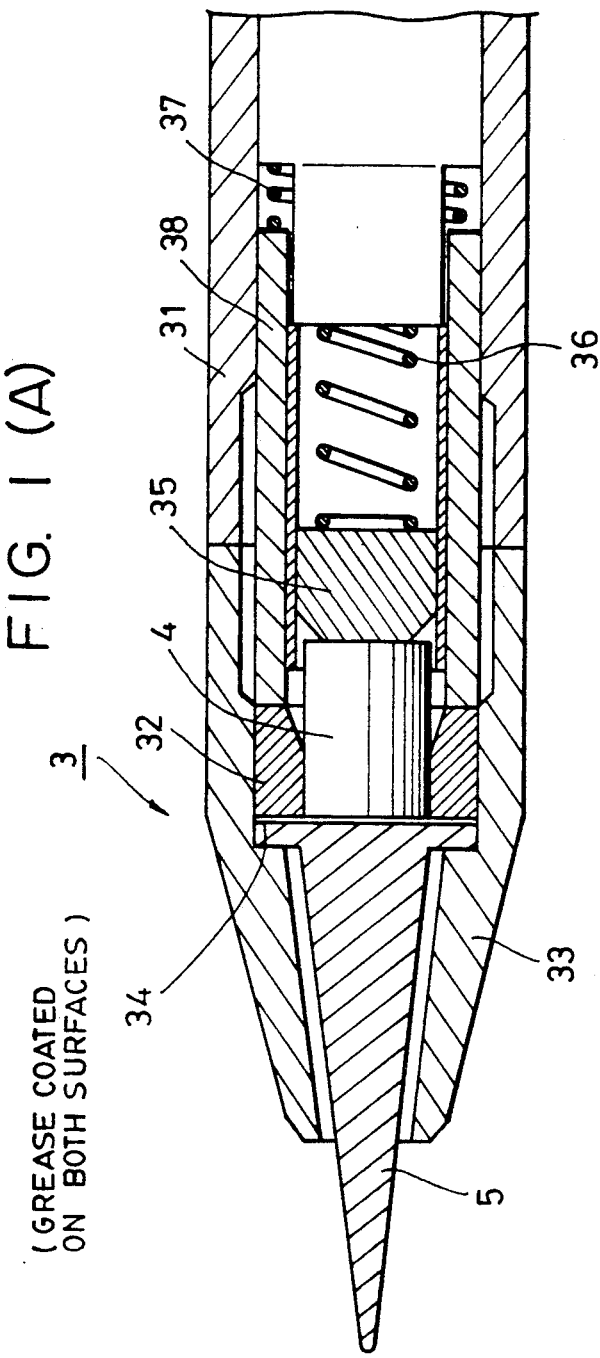
FIG. 1(A) is a diagram illustrating the structure of the principal part of a vibrating input pen according to an embodiment of the present invention.

The preferred embodiment of the present invention will now be explained in detail with reference to the attached drawings.

Explanation of Information Input/Output Apparatus (FIGS. 2-6)

Before explaining the configuration of a vibrating input pen for coordinate input according to the present embodiment, an explanation will be provided of an information input/output apparatus using the vibrating input pen for coordinate input.

FIG. 2 is a block diagram showing the configuration of an information input/output apparatus which adopts a vibrating input pen for coordinate input according to the present embodiment.

The information input/output apparatus shown in FIG. 2 inputs a coordinate on an input tablet consisting of a vibration transmitting plate 8 using a vibrating input pen 3, and displays an input image on a display 18, such as a CRT or a liquid-crystal display, arranged superposed under the input tablet, in accordance with the input coordinate information.

In FIG. 2, the vibration transmitting plate 8, made of acrylic resin, a glass plate or the like, transmits vibrations from the vibrating input pen 3 to three vibration sensors 6 provided at corner portions of the vibration transmitting plate 8. In the present embodiment, by measuring transmission times of the ultrasonic vibrations transmitted from the vibrating input pen 3 to the vibration sensors 6 via the vibration transmitting plate 8, it is possible to detect the coordinates of the vibrating input pen 3 on the vibration transmitting plate 8. In order to prevent the vibrations transmitted from the vibrating input pen 3 from returning in the directions toward a central portion after being reflected at circumferential portions of the vibration transmitting plate 8, an anti-reflection material 7 made of silicone rubber or the like supports circumferential portions of the vibration transmitting plate 8.

The vibration transmitting plate 8 is disposed on the display 18 capable of performing dot display, such as a CRT, a liquid-crystal display or the like, so that dot display is performed at positions traced by the vibrating input pen 3. That is, dot display is performed at positions corresponding to detected coordinates of the vibrating input pen 3 on the display 18. As a result, an image composed of elements, such as points, lines and the like, input from the vibrating input pen 3 is displayed on the display 18 so that it appears after the locus of the vibrating input pen 3 as if the image were written on a sheet of paper. According to such a configuration, it is also possible to indicate a desired item, function or the like by displaying menus on the display 18 and selecting a menu item using the vibrating input pen 3, displaying a prompt mark and contacting the vibrating input pen 3 at a predetermined position, and the like.

A method to determine the coordinate position of the vibrating input pen 3 will now be explained in detail.

First, an explanation will be provided of coordinate input using the vibrating input pen 3. The vibrating input pen 3 for transmitting an ultrasonic vibration to the vibration transmitting plate 8 incorporates a vibrator 4 composed of a piezoelectric element and the like. An ultrasonic vibration generated by the vibrator 4 is transmitted to the vibration transmitting plate 8 via a horn unit 5 having a pointed distal end. A driving signal for the vibrator 4 is supplied from an arithmetic and control circuit 1 as a low-level pulse signal, which is amplified with a predetermined gain by a vibrator driving circuit 2 capable of performing low-impedance drive and is supplied to the vibrator 4. This electric driving signal is transformed into a mechanical ultrasonic vibration by the vibrator 4, and the vibration is transmitted to the vibration transmitting plate 8 via the horn unit 5.

Next, an explanation will be provided of a method to detect the coordinates of the vibrating input pen 3. The vibration sensors provided at corner portions of the vibration transmitting plate 8 are composed of mechanical-electrical transducers, such as peizoelectric elements or the like. The vibration from the vibrating input pen 3 is transmitted through the vibration transmitting plate 8 and finally reaches the vibration sensors 6. The vibration is transformed into electrical signals by the three vibration sensors 6. Respective outputs from the three vibration sensors 6 are input to a vibration waveform detection circuit 9, and are converted into detection signals processable by the arithmetic and control circuit 1 in the following stage. The arithmetic and control circuit 1 measures transmission times of vibrations, and detects the coordinates of the vibrating input pen 3 on the vibration transmitting plate 8 according to the transmission times.

The detected information on the coordinates of the vibrating input pen 3 is processed in the arithmetic and control circuit 1 in accordance with a method of output from the display 18. That is, the arithmetic and control circuit 1 controls the output operation of the display 18 via a display driving circuit 10 according to the input information on the coordinate.

Figure 3:
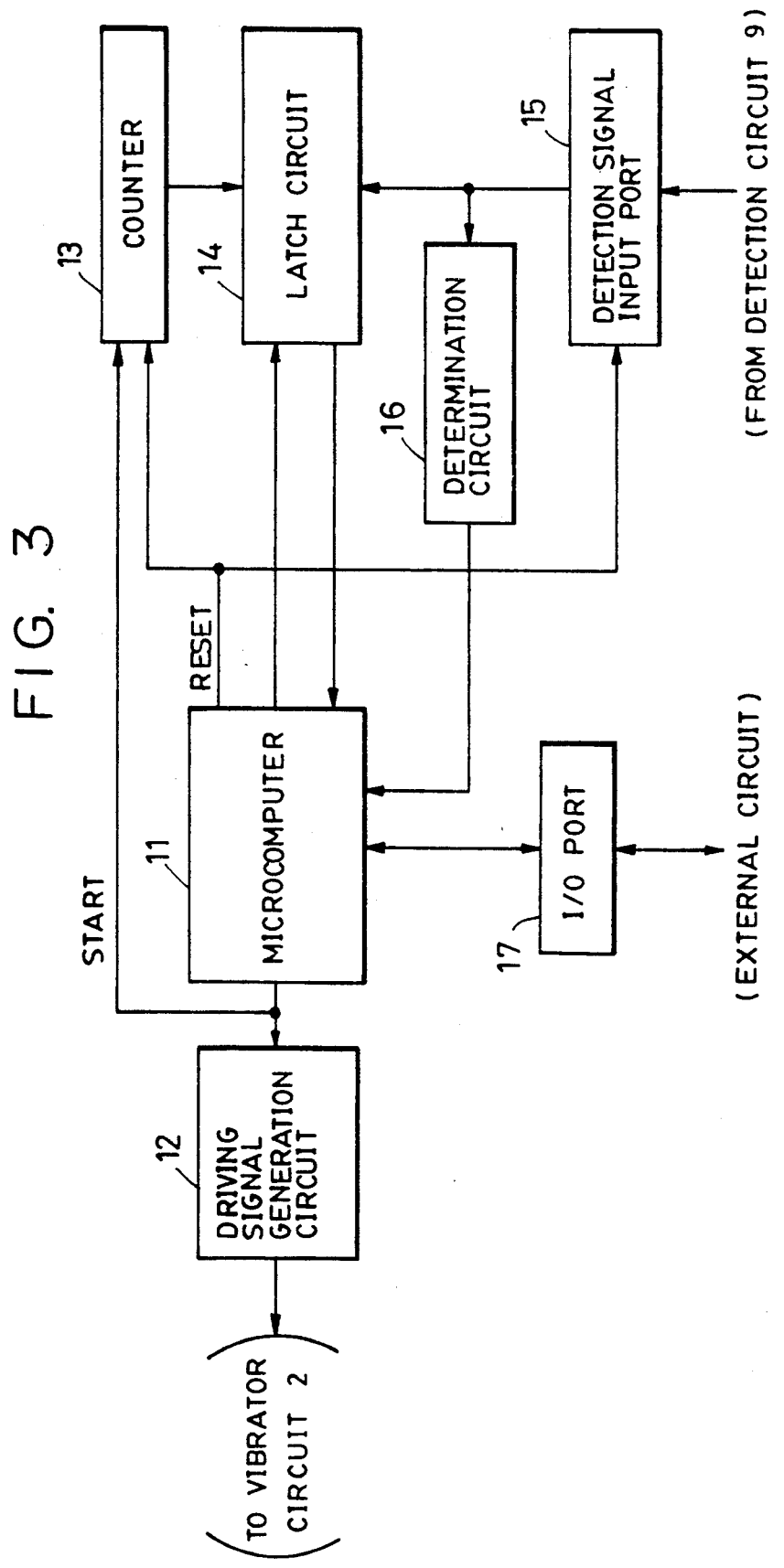
FIG. 3 is a block diagram showing the configuration of an arithmetic and control circuit.

FIG. 3 is a block diagram showing the schematic configuration of the arithmetic and control circuit 1. The arithmetic and control circuit 1 principally performs the drive of the vibrating input pen 3, the detection of vibrations by the vibration sensors 6 and the detection of the coordinate position.

A microcomputer 11 incorporates an internal counter (not shown), a ROM and a RAM storing control programs for the computer and the like. A driving signal generation circuit 12 outputs driving pulses having a predetermined frequency to the vibrator driving circuit 2 shown in FIG. 2, and is started by the microcomputer 11 in synchronization with a circuit for coordinate calculation.

The vibration waveform detection circuit 9 (FIG. 2) outputs timing information and level information for detection signals for measuring transmission times of vibrations for coordinate detection based on outputs from the vibration sensors 6, as will be described later. The timing and level information is input to an input port 15. When the detection signals are input, a latch circuit 14 latches a count value by a counter 13. Times until the vibrations reach the respective sensors are thereby measured.

A determination circuit 16 determines that a vibration detection signal from each sensor has been input to the detection signal input port 15, and notifies the microcomputer of the determination. The count value by the counter 13 thus latched represents the transmission time of the vibration. The coordinates of the vibrating input pen 3 are calculated according to the values of transmission times of the vibrations. The output control processing of the display 18 is performed via an input-/output port 17.

Figure 4:
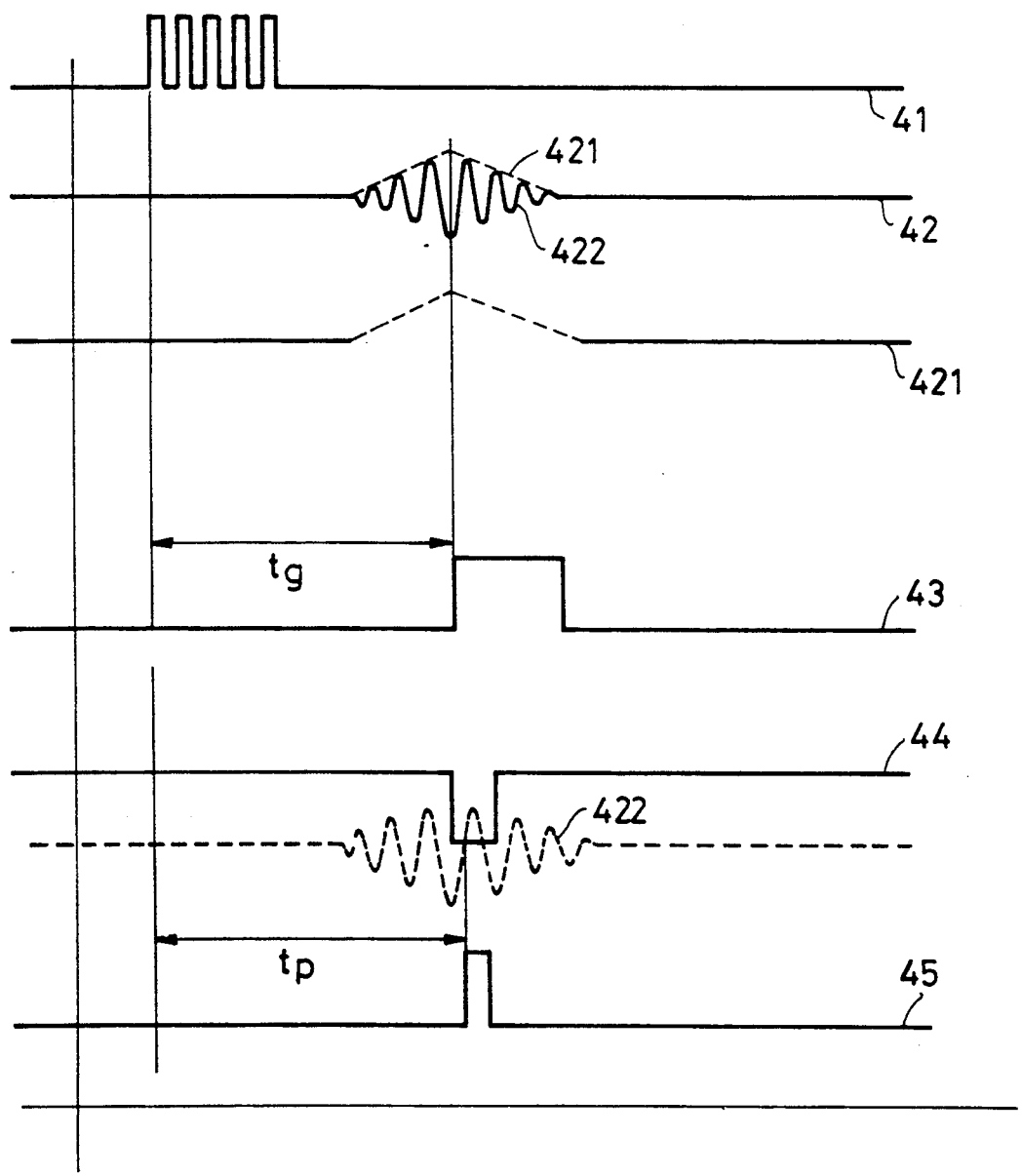
FIG. 4 is a diagram illustrating measurement processing of vibration transmission time.

FIG. 4 illustrates a detected waveform input to the vibration waveform detection circuit 9 shown in FIG. 2 and the measurement processing of the vibration transmission time according to the detected waveform. In FIG. 4, driving signal pulses 41 are supplied to the vibrating input pen 3. The ultrasonic vibration transmitted from the vibrating input pen 3 driven by such a waveform to the vibration transmitting plate 8 is detected by the vibration sensor 6 after passing through the vibration transmitting plate 8.

The vibration proceeds through the vibration transmitting plate 8 for a time tg corresponding to the distance to the vibration sensor 6, and reaches the vibration sensor 6. Reference number 42 in FIG. 4 indicates a signal waveform detected by the vibration sensor 6. Since the plate wave used in the present embodiment is a dispersive wave, the relationship between the envelope 421 and the phase 422 of the detected waveform changes in accordance with the transmission distance of the vibration.

The distance between the vibrating input pen 3 and the signal sensor 6 can be detected from a difference between the group velocity Vg and the phase velocity Vp of the envelope 421.

If attention is paid only to the envelope 421, its velocity is Vg. If a particular point on the waveform, for example its peak, is detected as shown by reference number 43 in FIG. 4, the distance d between the vibrating input pen 3 and the vibration sensor 6 is expressed by:

$$d = V_g \cdot t_g \quad (1)$$

where tg is the transmission time of the vibration. While this expression relates to one of the vibration sensors 6, the distances between the other two vibration sensors 6 and the vibrating input pen 3 can be expressed by the same expression.

In order to determine a more accurate coordinate value, processing according to the detection of a phase signal is performed. If a time from a particular detection point of the phase waveform 422 in FIG. 4, for example from the time of the application of the vibration, to a zero-crossing point after the passage of the peak is represented by tp, the distance between the vibration sensor 6 and the vibrating input pen 3 is expressed by:

$$d = n \cdot \lambda p - V p \cdot t p \quad (2)$$

where λp is the wavelength of the elastic wave, and n is an integer.

From the above-described expressions (1) and (2), the above-described integer n is expressed by:

$$n = [(V_g \cdot t_g - V_p \cdot t_p)/\lambda_p - 1/N] \quad (3)$$

where N is a real number other than "0", and a proper numerical value is used for N. For example, if N=2, the value n can be determined within $\pm \frac{1}{2}$ of the wavelength.

By substituting the value n obtained as described above into expression (2), it is possible to exactly measure the distance between the vibrating input pen 3 and the vibration sensor 6.

Figure 5:
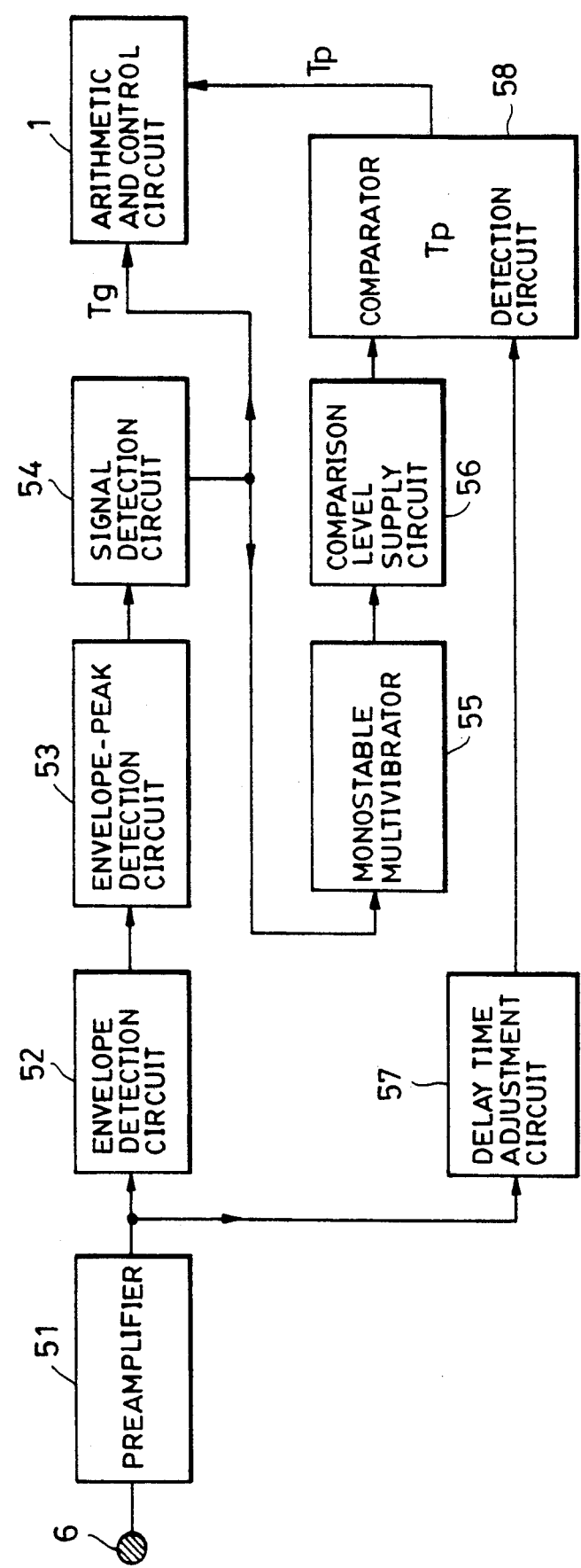
FIG. 5 is a block diagram of a waveform detection circuit.

FIG. 5 is a diagram showing the schematic configuration of the vibration waveform detection circuit 5.

The output signal from the vibration sensor 6 is amplified to a predetermined level by a preamplifier 51. The amplified signal is input to an envelope detection circuit 52, wherein only the envelope of the detection signal is extracted. The timing of the peak of the extracted envelope is detected by an envelope-peak detection circuit 53. According to a peak detection signal thus detected, an envelope-delay-time detection signal Tg having a predetermined waveform is formed by a signal detection circuit 54 composed of a monostable multivibrator and the like, and is input to the arithmetic and control circuit 1. A detection circuit 58 forms a phase-delay-time detection signal Tp from the timing of the signal Tg and the original signal delayed by a delay time adjustment circuit 57, and the signal Tp is input to the arithmetic and control circuit 1.

The signal Tg is also converted into pulses having a predetermined width by a monostable multivibrator 55. A comparison level supply circuit 56 forms a threshold value for detecting the Tp signal in accordance with the timing of the pulses. As a result, the comparison level supply circuit 56 forms a signal 44 having the signal level and timing as shown in waveform 44 of FIG. 4, and inputs the signal 44 to the detection circuit 58. The monostable multivibrator 55 and the comparison level supply circuit 56 are provided so that the measurement of the phase delay time is operated only during a predetermined time after the detection of the peak of the envelope.

The signal 44 is input to the detection circuit 58 composed of a comparator and the like, where it is compared with the detected waveform delayed as shown in FIG. 4. As a result, a tp detection pulse 45 is formed as shown in waveform 45 of FIG. 4.

The above-described circuit is for one of the vibration sensors 6. The same circuit is provided for each of the other sensors 6. If it is assumed that there are h sensors in general, h detection signals for the envelope delay times Tg1−h and the phase delay times Tp1−h are input to the arithmetic and control circuit 1, respectively.

In the arithmetic and control circuit 1 shown in FIG. 3, the above-described signals Tg1−h and Tp1−h are input to the input port 15, and count values by the counter 13 are taken in the latch circuit 14 using respective timings as triggers. As described above, since the counter 13 starts to count time in synchronization with the drive of the vibrator 4, data indicating respective delay times of the envelope and phase are taken in the latch 14.

Figure 6:
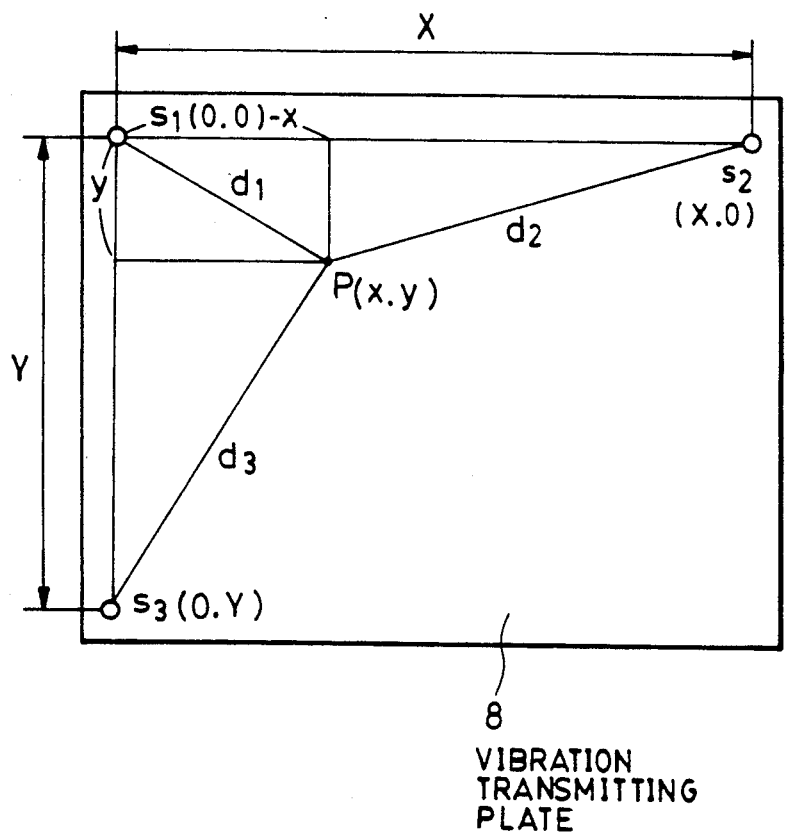
FIG. 6 is a diagram illustrating the arrangement of vibration sensors.
Figure 7A:
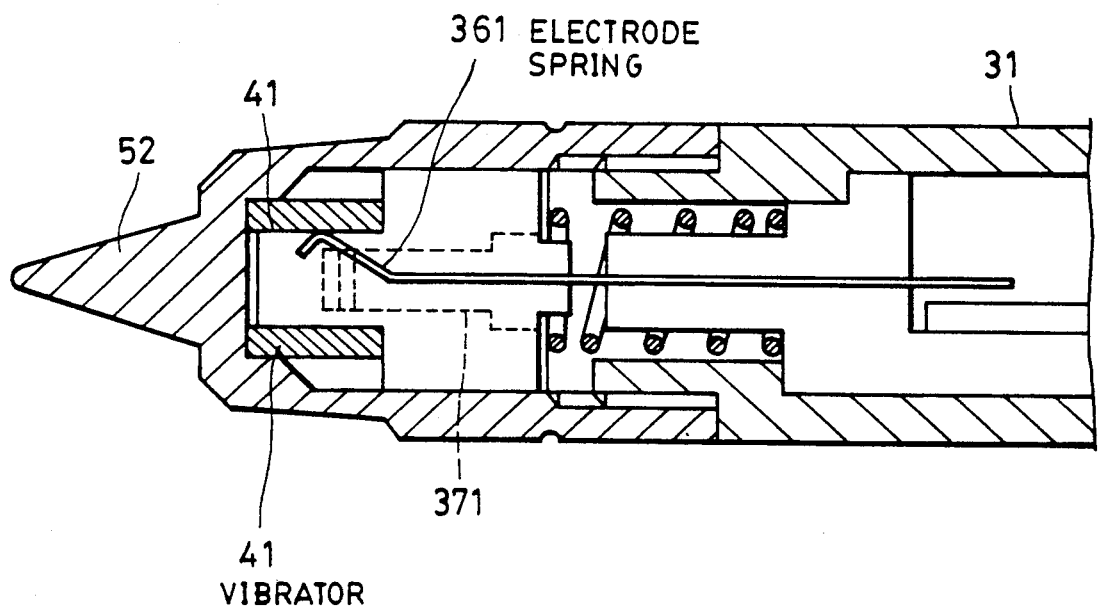
FIGS. 7(A)-7(D) are cross-sectional views of principal parts showing the internal structures of conventionally utilized vibrating input pens.
Figure 7B:
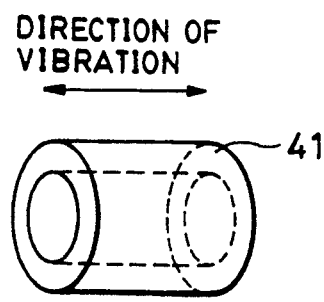
Figure 7C:
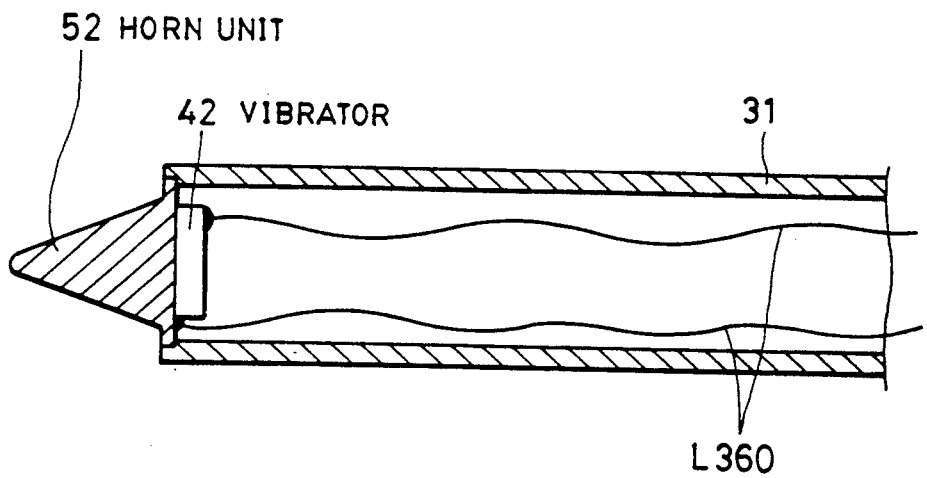
Figure 7D:
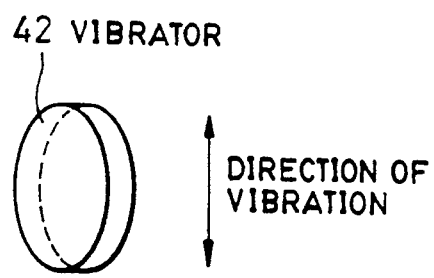

FIG. 6 is a diagram illustrating the mounting positions of the vibration sensors 6. If the three vibration sensors 6 are disposed at positions S1–S3 at corner portions of the vibration transmitting plate 8, straight distances $d_1$–$d_3$ from the position P of the vibrating input pen 3 to the positions of the respective vibration sensors 6 can be obtained according to the processing explained with reference to FIG. 4. Furthermore, the coordinate (x, y) of the position P of the vibrating input pen 3 can be obtained by the arithmetic and control circuit 1 using the straight distances $d_1-d_3$ from the theorem of three squares as shown in the following expressions:

$$x = X/2 - (d_1 - d_2)(d_1 - d_2)/2X \quad (4)$$

$$y = Y/2 - (d_1 - d_3)(d_1 - d_3)/2Y \quad (5)$$

In these expressions, X and Y are distances along the X and Y axes between the vibration sensors 6 at positions S2 and S3 and the sensor 6 at the origin (position S1(0,0)), respectively.

As described above, the position coordinates of the vibrating input pen 3 can be detected in real time.

Explanation of Vibrating Input Pen (FIG. 1)

Figure 1B:
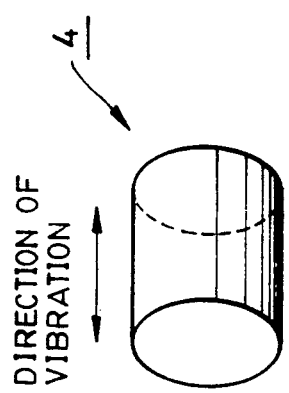
FIG. 1(B) is a diagram illustrating the shape of the vibrator of the vibrating input pen of the embodiment.

FIGS. 1(A) and 1(B) illustrate the structure of the principal part of the vibrating input pen 3 according to the embodiment of the present invention.

In FIG. 1(A), the vibrator 4 incorporated in the vibrating input pen 3 is driven by the above-described vibrator driving circuit 2. An electric driving signal is transformed into a mechanical ultrasonic vibration by the vibrator 4, and the vibration is transmitted to the vibration transmitting plate 8 via the horn unit 5. As shown in FIG. 1(B), the vibrator 4 having a columnar shape utilizes a direction-K33 piezoelectric element wherein the direction of its polarization is parallel to the direction of its vibration.

The vibrator 4 is positioned so that its axis is aligned with respect to the horn unit 5 using a positioning member 32 buried in a gap. The positioning member 32 and the horn unit 5, whose respective outer-diameters are subjected to clearance-fitting with a pen-point protective member 33, are positioned so that their respective axes are aligned with each other. The ground-side electrode of the vibrator 4 is connected to the vibrator driving circuit 2 via an electrode plate 34, the positioning member 32, a conductive ring 38 and an electrode spring 37. The signal-side electrode of the vibrator 4 is connected to the vibrator driving circuit 2 via an electrode pin 35 and an electrode spring 36. A case 31 of the pen and the pen-point protective member 33 are formed as a single unit using a screwed portion of the conductive ring 38. As a result, the pen point is supported on the case 31 of the pen by the pen-point protective member 33.

As is apparent from the foregoing explanation, the structure of the present embodiment shown in FIG. 1 permits the configuration of the vibrating input pen 3 to be perfectly symmetrical with respective to its axis.

The electrode plate 34 may be made of a copper foil (for example, 0.02 mm thick), sandwiched between the horn unit 5 and the vibrator 4 with a conductive viscous material, such as grease or the like, coated on both surfaces of the plate 34, and may be fixed with pressure using the electrode spring 36 via the electrode pin 35. In this case, in order to secure electric conduction, the electrode plate 34 is fixed also with a pressure due to a screw formed in the positioning member 32.

Thus, by coating grease or the like on the electrode member, the problem of the directivity of the pen can be solved. Moreover, it is possible to remove production control problems related to bonding, such as inspection of mixing of bubbles and incomplete bonding, administration of the thickness of an adhesive layer and the like, and therefore to improve productivity in the production of the pen.

What is claimed is:

1. A vibrating input pen used for a coordinate input apparatus for detecting a coordinate of an input position of a vibration by detecting the vibration input from the vibrating input pen to a vibration transmitting plate, said vibrating input pen comprising:
   a vibration generating element for generating a vibration;
   a horn member forming a pen point of said vibrating input pen for transmitting the vibration generated from said vibration generating element;
   a position member for positioning so that the direction of vibration of said vibration generating element substantially coincides with the direction of vibration of said horn member, and the axis of said vibration generating element substantially coincides with the axis of said horn member; and
   a housing member for positioning and fixing said positioning member and said horn member as a single unit.

2. A vibrating input pen according to claim 1, wherein said positioning member also functions as a conductive member for an electrode member of said vibration generating element.

3. A vibrating input pen according to claim 2, wherein the electrode member of said vibration generating element situated opposite to said horn member places said vibration generating element in pressure contact with said horn member.

4. A vibrating input pen according to claim 1, 2 or 3, wherein said horn member is detachable from a case of said vibrating input pen.

5. A vibrating input pen used for a coordinate input apparatus for detecting a coordinate of an input position of a vibration by detecting the vibration input from the vibrating input pen to a vibration transmitting plate, said vibrating input pen comprising:
   a vibration generating element for generating a vibration;
   a horn member forming a pen point of said vibrating input pen for transmitting the vibration generated from said vibration generating element;
   an electrode member interposed between said vibration generating element and said horn member;
   a positioning member for positioning and fixing said vibration generating element relative to said horn member so that the direction of vibration of said vibration generating element substantially coincides with the direction of vibration of said horn member, and the axis of said vibration generating element substantially coincides with the axis of said horn member;
   a housing member for positioning and fixing said positioning member and said horn member as a single unit; and
   a pressure contact member for placing said vibration generating member in pressure contact with said electrode member.

6. A vibrating input pen according to claim 5, wherein said positioning member also functions as a conductive member for the electrode member interposed between said vibration generating element and said horn member.

7. A vibrating input pen according to claim 5, wherein said horn member is detachable from a case of said vibrating input pen.

8. A vibrating input pen used for a coordinate input apparatus for detecting a coordinate of an input position of a vibration by detecting the vibration input from the vibrating input pen to a vibration transmitting plate, said vibrating input pen comprising:
- a vibration generating element for generating a vibration;
- a horn member forming a pen point of said vibrating input pen for transmitting the vibration generated from said vibration generating element;
- an electrode member interposed between said vibration generating element and said horn member;
- a viscous member coated on two surfaces of said electrode member;
- a positioning member for positioning and fixing said vibration generating element relative to said horn member so that the direction of vibration of said vibration generating element substantially coincides with the direction of vibration of said horn member, and the axis of said vibration generating element substantially coincides with the axis of said horn member;
- a housing member for positioning and fixing said positioning member and said horn member as a single unit; and
- a pressure contact member for placing said vibration generating member and said electrode member in pressure contact with said horn member.

9. A vibrating input pen according to claim 8, wherein said positioning member also functions as a conductive member for said electrode member.

10. A vibrating input pen according to claim 9, wherein said horn member is detachable from a case of said vibrating input pen.

11. A vibrating input pen according to claim 8, wherein said viscous member comprises grease.

12. A vibrating input pen according to claim 8, wherein said pressure contact member comprises a spring member, and also functions as another electrode member.

* * * * *